Feb. 28, 1950 J. N. MARSHALL 2,499,225
DATA TRANSMISSION SYSTEM
Filed Nov. 26, 1947
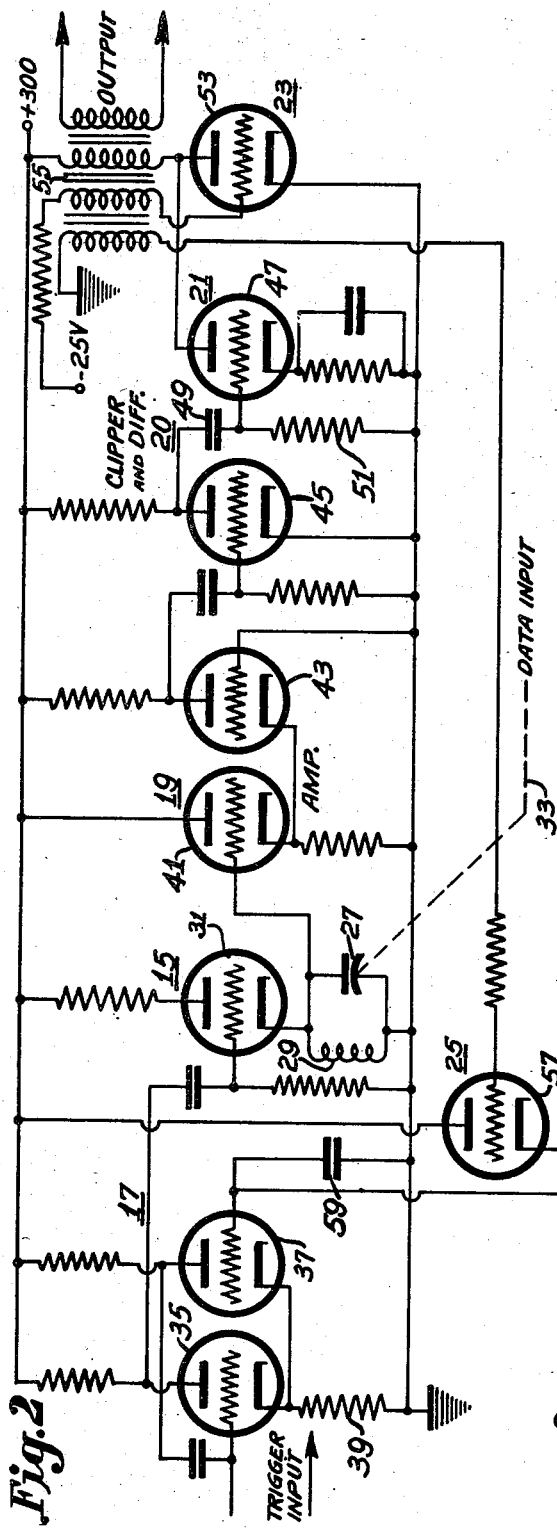
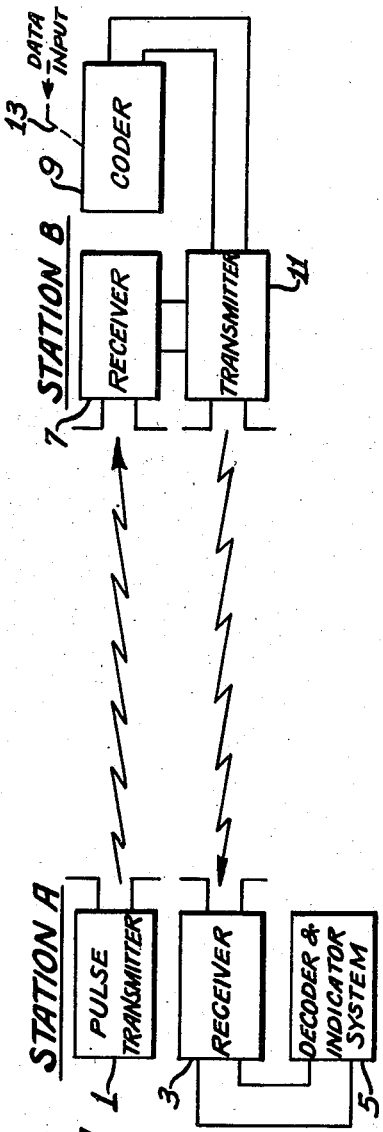
Inventor:
John N. Marshall
By J. L. Whittaker
Attorney Patented Feb. 28, 1950

2,499,225

UNITED STATES PATENT OFFICE 2,499,225

DATA TRANSMISSION SYSTEM

John N. Marshall, Philadelphia, Pa., assignor to Radio Corporation of America, a corporation of Delaware Application November 26, 1947, Serial No. 788,267

4 Claims. (Cl. 177—380)

This invention relates to improvements in data transmission systems, more particularly systems wherein a variable quantity is sampled periodically to produce a coded signal for transmission to a remote point. The signal received at the remote point is decoded and used for indication or control in accordance with variations of the original data or quantity.

Reference is made to copending U. S. Patent application Serial Number 618,969, filed September 27, 1945, by Philip J. Herbst, and entitled Radio navigation system. Said application relates to an aircraft navigation system wherein a ground-based search radar station provides PPI (plan position indications) of the aircraft within its service area, said indications being relayed by television to the aircraft. Since the personnel on an aircraft is interested in the positions of only the other aircraft which are flying at approximately the same altitude, the ground station is provided with a plurality of position indicators, each assigned to a different altitude layer, and means are provided on each craft for selecting the display showing the altitude layer in which it is flying.

Each aircraft carries a "transponder" beacon, comprising a receiver which responds to signals from the ground radar and a transmitter controlled by the receiver to send signals back to the ground station. The transponder also includes means for coding the signals transmitted to the ground, in accordance with the altitude of the aircraft. The return signals are decoded, i. e. separated according to the altitude information impressed upon them by the airborne beacon, and applied to the corresponding plan position indicator.

In the system of said copending application the coding means in the airborne beacon includes a delay circuit whose delay is varied according to altitude. The signal received from the ground station (hereinafter referred to as the "interrogation" signal) is applied to the beacon transmitter both directly and through the delay circuit. As a result, the beacon transmitter provides two output pulses, the interval between them being a measure of the altitude.

It is found that a two-pulse code like that used in the above described system is not entirely satisfactory because the return signals from two or more airborne beacons may overlap at the ground station, causing improper operation of the plan position indicators. The difficulty may be minimzed by the use of a three-pulse code, wherein the pulses are separated by equal intervals which depend upon the altitude. Although combinations of range and altitude for two or more aircraft can occur so as to produce groups of three equally spaced pulses which do not all come from the same airborne beacon, the probability is remote.

One practical application of the present invention is as an altitude coding device providing three or more equally spaced pulses in response to an interrogation signal.

The principal object of the present invention is to provide improved methods and means for producing characteristically coded signals in response to variable input data.

More specifically, it is an object of this invention to provide a coding circuit which will produce, in response to an interrogating or triggering signal, a predetermined small number of output pulses, separated by intervals which depend upon the current or present input information.

The invention will be described with reference to the accompanying drawing, wherein Figure 1 is a schematic block diagram of a data transmission system including a coding device which may be of the type contemplated by the present invention, and Figure 2 is a circuit diagram of a coding device embodying this invention.

Referring to Fig. 1, a station A, which may be a ground-based radar station, includes a pulse transmitter 1, a receiver 3, and a decoder and indicator system 5 connected to the receiver 3. The circuitry of said decoder system is explained in an article published in RCA Review for December 1947 at pages 620 to 621. A station B, which may be an airborne transponder beacon, includes a receiver 7, a coder 9, and a transmitter 11. The receiver 7 responds to the transmitter 1, and the receiver 3 responds to the transmitter 11.

In operation, interrogating pulses from the transmitter 1 are received periodically by the receiver 7 and applied to the coder 9. The information to be transmitted, for example altitude, may be applied to the coder 9 by adjustment or rotation of an input shaft, as indicated by the dash line 13. The output of the coder 9 comprises two or more pulses, spaced apart by an interval which depends upon the input information. The code signal is transmitted by the transmitter 11 to the receiver 3 and applied to the decoder and indicator system 5.

The circuit of the coder 9, which is the subject of the present invention, is shown in Fig. 2. This circuit includes an oscillator 15, a trigger circuit 17 arranged to start and stop the oscillator 15, means generally designated by the reference characters 19, 20, and 21 for amplifying and modifying the wave shape of the output of the oscillator 15, and a pulse generator 23 controlled by the modified wave. A counter circuit 25 is supplied with output from the pulse generator 23 and is connected to actuate the trigger circuit 17 in a manner to be described.

In the present example, the oscillator 15 is of the so-called "ringing" or shock-excited type, including a parallel resonant circuit comprising a capacitor 27 and an inductor 29. A vacuum tube 31 is connected in series with the resonant circuit 27, 29 and is biassed so that it normally draws a substantial space current which flows through the resonant circuit.

Any sudden change in this current tends to excite oscillations in the circuit 27, 29. As long as the tube 31 is heavily conducting, it connects the plate supply source across the resonant circuit. Since the supply source has a relatively low impedance, its damping effect prevents oscillation. However, if the tube 15 is suddenly cut off, the circuit 27, 29 is damped only by its own losses, so it oscillates or "rings." The oscillation will gradually die out, or can be stopped at any time by making the tube 31 conductive again. The frequency of oscillation may be varied by adjustment of the capacitor 27. This is controlled by positioning a shaft 33 in accordance with the data or information to be transmitted.

The control grid of the tube 31 is coupled to the trigger circuit 17. The trigger circuit illustrated is of the cathode coupled multivibrator type, comprising two tubes 35 and 37 with a common cathode resistor 39, the plate of the tube 37 being coupled to the grid of the tube 35.

Only one of the tubes 35 and 37 will conduct at a time. A positive voltage applied to the grid of the tube 35 will cause that tube to conduct; the resulting voltage drop in the resistor 39 keeps the tube 37 cut off. This condition persists until a sufficiently high positive voltage is applied to the grid of the tube 37 to overcome the cathode voltage and start conduction. This decreases the potential at the plate of the tube 37, applying a negative pulse to the grid of the tube 35, which is then cut off and remains so until another positive pulse is applied to its grid.

The potential at the plate of the tube 35 decreases when that tube conducts, and increases when it is cut off, thus starting the oscillator 15 in response to a positive pulse at the grid of the tube 35 and stopping the oscillator when the grid of the tube 37 attains a sufficiently positive potential.

The amplifier 19 comprises two tubes 41 and 43. The tube 41 is connected as a cathode follower, and its grid is connected to the resonant circuit of the oscillator 15. The tube 43 is connected as a cathode input amplifier, with its grid grounded and its cathode connected to that of the tube 41.

The grid circuit of the tube 41 presents a substantially infinite impedance to the resonant circuit 27, 29 and hence does not introduce any appreciable damping. The design of the amplifier 19 is such as to cause a certain amount of voltage limiting, so that the output appearing at the plate of the tube 43 is a flat topped wave of more or less constant amplitude.

The amplifier 20 also includes two tubes, 45 and 47. The circuit elements associated with the tube 45 are so proportioned that this stage also acts as a clipper or limiter, providing an output which has a relatively abrupt wave front. The tube 45 is coupled to the tube 47 through a circuit comprising a capacitor 49 and a resistor 51 and designed to act as a differentiating network.

The pulse generator 23 is a blocking oscillator, comprising a tube 53 with its plate and grid circuits closely coupled to each other through a transformer 55. In addition to its plate and grid windings, the transformer includes a third winding which is connected to the counter circuit 25, and a fourth winding from which the output of the coder circuit is taken. The plate of the blocking oscillator tube 53 is connected to that of the amplifier tube 47.

The tube 53 is biassed so that the oscillator 23 is normally quiescent, i. e. non-oscillating. Pulsations in the plate current drawn by the amplifier tube 47 cause corresponding variations in the voltage at the plate of the oscillator tube. The oscillator 23 executes one complete cycle in response to each such pulsation, providing a single narrow output pulse.

The counter circuit 25 comprises a tube 57 with its plate connected directly to the positive terminal of the plate supply source, and a capacitor 59 connected from the cathode of the tube 57 to ground. The upper terminal of the capacitor 59 and the cathode of the tube 57 are connected to the grid of the trigger circuit tube 37. The output pulses from the blocking oscillator 23 are applied in positive-going polarity to the grid of the tube 57.

Each pulse from the oscillator 23 causes the tube 57 to conduct momentarily, depositing a charge in the capacitor 59. Successive charges increase the voltage across the capacitor stairstep fashion, until the voltage at the grid of the tube 37 becomes positive with respect to the cathode. The tube 37 then starts to conduct, and the accumulated charge on the capacitor 59 leaks off by way of grid current drawn by the tube 37.

The overall operation of the circuit of Figure 2 is substantially as follows:

An interrogating pulse applied to the grid of the trigger circuit tube 35 makes the potential at the plate of said tube decrease, cutting off the tube 31. The resonant circuit 27, 29 starts to "ring," at a frequency determined by the setting of the data input shaft 33. The approximately sinusoidal output from the ringing oscillator 15 is amplified and reshaped by the circuits 19, 20 and 21, and controls the blocking oscillator 23.

The blocking oscillator 23 provides one sharp output pulse for each oscillation of the ringing circuit 27, 29. The spacing between the output pulses depends upon the position of the data input shaft 33. The counter 25 builds up a voltage across the capacitor 59, one step per output pulse. When a predetermined number of output pulses (for example, three) has occurred, the voltage across the capacitor 59 is sufficient to start conduction in the tube 37, thereby stopping conduction in the tube 35. This applies a positive pulse to the ringing oscillator tube 31 and stops oscillation of the circuit 27, 29.

The number of output pulses produced in response to each interrogation pulse is determined by the capacitance of the capacitor 59, the voltage of the plate supply source, and the amplitude of the pulses applied to the grid of the counter tube 57. Any or all of these factors may be adjusted to cause the production of a desired number of output pulses.

Although a specific embodiment of the invention has been described, it will be apparent to those skilled in the art that the various elements described are merely by way of example, and that other known elements capable of performing the same functions may be substituted. Summarizing briefly, the invention has been described as a coding device for data transmission systems, comprising an oscillator whose frequency is varied in accordance with the data to be transmitted, means for starting the oscillator in response to an interrogation signal and means for stopping the oscillator at the end of a predetermined number of cycles of oscillation. Thus each interrogation signal results in the production of a predetermined number of output pulses, spaced apart by an interval corresponding to the input data.

I claim as my invention:

1. In a data transmission system including means for producing an interrogation signal and indicator means responsive to a characteristically coded reply signal to indicate quantitative information carried by said reply signal, a circuit for producing said reply signal in the form of a group of at least two pulses separated by an interval which corresponds to the quantitative value of said information, said circuit comprising a ringing oscillator, a trigger circuit responsive to said interrogation signal to start said oscillator, means responsive to the data to be transmitted to control the frequency of said oscillator, a pulse generator controlled by said oscillator to produce a pulse in response to each oscillation from said oscillator, the output of said pulse generator constituting said reply signal, and a counter circuit responsive to said pulse generator and connected to said trigger circuit to stop said oscillator upon the production of a predetermined number of pulses by said pulse generator.

2. In a data transmission system including means for producing an interrogation signal and indicator means responsive to a characteristically coded reply signal to indicate quantitative information carried by said reply signal, a circuit for producing said reply signal in the form of a group of pulses separated by intervals which correspond to the quantitative value of said information, said circuit comprising an oscillator, means responsive to said interrogation signal to start said oscillator, means responsive to the data to be transmitted to control the frequency of said oscillator, a pulse generator controlled by said oscillator to produce a pulse in response to each oscillation from said oscillator, the output of said pulse generator constituting said reply signal, and means responsive to said pulse generator to stop said oscillator upon the production of a predetermined number of pulses by said pulse generator.

3. In a data transmission system including means for producing an interrogation signal and means responsive to a characteristically coded reply signal to indicate information carried by said reply signal, apparatus for producing said reply signal comprising means for initiating, in response to said interrogating signal, a voltage wave train whose frequency depends upon the current value of the data to be transmitted, means for generating pulses in response to said wave train, said pulses being separated by intervals equal to the period of said wave, means for counting said pulses up to a predetermined number N, and means for stopping said wave train in response to the occurrence of the Nth one of said pulses.

4. In a data transmission system including means for producing an interrogation signal and means responsive to a characteristically coded reply signal to indicate information carried by said reply signal, apparatus for producing said reply signal comprising means for initiating, in response to said interrogating signal, a pulse train whose repetition frequency depends upon the current value of the data to be transmitted, means for counting said pulses up to a predetermined number N, and means for stopping said pulse train in response to the occurrence of the Nth one of said pulses.

JOHN N. MARSHALL.

REFERENCES CITED

The following references are of record in the file of this patent:

UNITED STATES PATENTS

| Number | Name | Date |
| --- | --- | --- |
| 1,894,019 | Buckley | Jan. 10, 1933 |
| 2,110,015 | Fitz Gerald | Mar. 1, 1938 |
| 2,252,083 | Luck | Aug. 12, 1941 |
| 2,378,604 | Wallace | June 19, 1945 |
| 2,403,603 | Korn | July 9, 1946 |
| 2,405,597 | Miller | Aug. 13, 1946 |
| 2,408,037 | Bowsher et al. | Sept. 24, 1946 |
| 2,415,359 | Loughlin | Feb. 4, 1947 |
| 2,430,547 | Anderson | Nov. 11, 1947 |
| 2,438,904 | De Rosa | Apr. 6, 1948 |